V. M. GOLDSCHMIDT AND O. RAVNER.
PROCESS OF PRODUCING ALUMINA POOR IN IRON.
APPLICATION FILED MAR. 31, 1919.
1,413,720.
Patented Apr. 25, 1922.
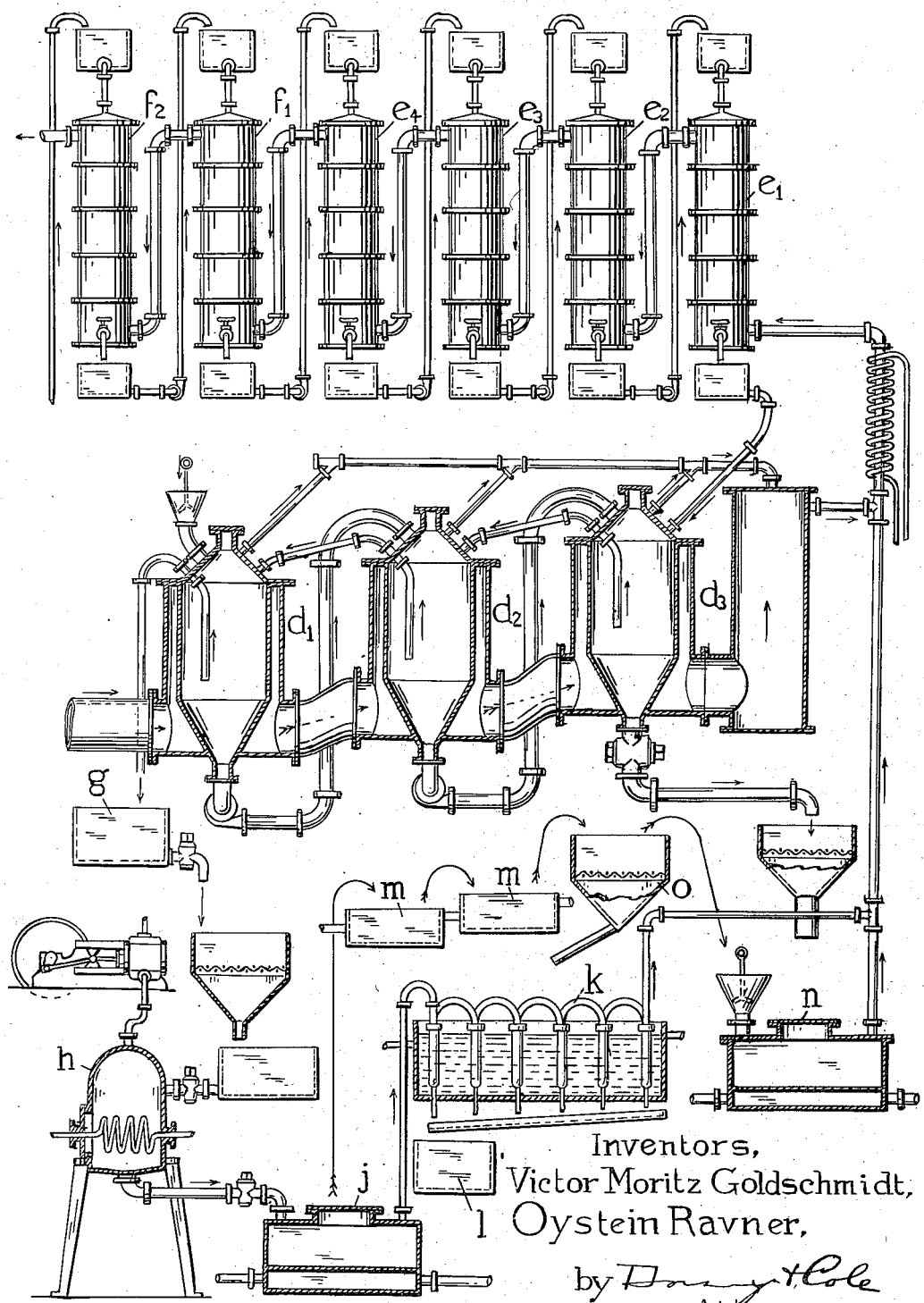
Inventors,
Victor Moritz Goldschmidt,
Oystein Ravner,
by Dougherty & Cole
Attorneys.

UNITED STATES PATENT OFFICE.

VICTOR MORITZ GOLDSCHMIDT AND OYSTEIN RAVNER, OF CHRISTIANIA, NORWAY, ASSIGNORS TO DET NORSKE AKTIESELSKAB FOR ELEKTROKEMISK INDUSTRI, OF CHRISTIANIA, NORWAY.

PROCESS OF PRODUCING ALUMINA POOR IN IRON.

1,413,720.  Specification of Letters Patent.  Patented Apr. 25, 1922.

Application filed March 31, 1919. Serial No. 286,378.

*To all whom it may concern:*

Be it known that we, VICTOR MORITZ GOLDSCHMIDT and OYSTEIN RAVNER, subjects of Norway, and residents of Christiania, respectively, in the Kingdom of Norway, have invented certain new and useful Improvements in Processes of Producing Alumina Poor in Iron, of which the following is a specification.

This invention relates to the manufacture of alumina in a comparatively pure condition such as is generally used for the production of aluminium and for other purposes.

The object of the invention is a combination of several technical processes of manufacture which has proved to give very good results as well in regard to economy as to the product obtained.

As the raw material of our process we use labradorite or similar minerals and we decompose it by means of nitric acid. By such decomposition the Ca and Na present will dissolve in the same proportion as the Al. We prefer nitric acid to other decomposing agents, as a certain amount of decomposing agent will combine with the Ca and Na, and it is a great advantage to obtain these compounds in the form of valuable salts as calcium nitrate and sodium nitrate. Therefore it is convenient to combine the manufacture of alumina from labradorite and similar minerals with a plant for the manufacture of nitric acid.

By the decomposition of labradorite with nitric acid, oxides of nitrogen are formed in the same way as when limestone is dissolved in nitric acid, and it is a great advantage being able to utilize these oxides by leading them directly into the absorption towers of a modern nitric acid plant.

The nitrates resulting from such treatment are dissolved and separated from insoluble silica and undissolved minerals rich in iron. The nitrates are principally aluminium nitrate, calcium nitrate and alkali metal nitrate. We heat these nitrates to about 300° C. whereby aluminium nitrate is decomposed while the others remain unaltered. The nitric acid and nitrous gases resulting from such decomposition may in our process be recovered by leading them into the absorption towers of above mentioned nitric acid plant. This plant must produce sufficient nitric acid to cover the mechanical losses of the process and also the quantities of nitric acid removed in the form of nitrates. A great advantage by our combination of a nitric acid plant with a plant for decomposition of labradorite is that the nitric acid from the absorption towers of the nitric acid plant containing about 30% $HNO_3$ may be used directly for decomposition of labradorite without further concentration.

The decomposition process is preferably carried out continuously according to the counter current principle, whereby a neutral solution is obtained. The iron in solution is removed by precipitation with alumina or with potassiumferrocyanide or both. After removal of the iron the solution is evaporated and the residue calcined to decompose $Al(NO_3)_3$ but not the other nitrates. These are removed by lixiviation and recovered by evaporation of the resulting solution, while the alumina is removed by filtration and dried or calcined whereby practically pure $Al_2O_3$ is obtained.

In order to illustrate the method of working according to our invention and the advantages obtained thereby, we give in the following a detailed example of our process, reference to be had to the accompanying drawing forming part of the application.

In the vats $d_1$ $d_2$ and $d_3$ the decomposition and dissolution of labradorite by means of nitric acid is carried out according to the counter current principle. We lead 30% nitric acid from the absorption towers $e_1$—$e_4$ into the vat $d_3$. The acid passes on into vats $d_2$ and $d_1$ thus encountering pulverized labradorite which we introduce in the vat $d_1$ and which passes from the vat $d_1$ to vats $d_2$ and $d_3$. We regulate the quantities in such manner that the nitric acid when it has passed the vat $d_1$ is completely neutralized and assumes a reddish colour which indicates the beginning of a basic precipitation. The undecomposed constitutents of the labradorite leaving the vat $d_3$ principally consist of pure silica and a smaller amount of undecomposed silicates especially those containing iron, which are filtered off and washed and then removed from the process.

The nitrogen oxides formed during this part of the process are led directly to the absorption towers of the nitric acid plant.

The solution leaving the vat $d_1$ principally contains $Al(NO_3)_3, Ca(NO_3)_2$ and alkali metal nitrates and small amounts of iron. The solution is led into the vat $g$ in which it is freed from iron. We may precipitate the iron by means of the calcined mass from the calcining apparatus $j$ later to be referred to, or by means of alumina from the vats $m$, which we add in portions to the solution until no further precipitation takes place; or, if preferred, by adding pulverized limestone in excess to that necessary for precipitation of the iron present in the solution. It is not advisable to add the whole amount of the precipitating agent at once as the precipitating agent then may become covered by precipitated ferric hydrate which prevents it from further action as a precipitant. We stir the solution during precipitation and keep the temperature at about 40° C.

We have found that by precipitating the iron in this manner we also remove the small amounts of colloidal silica present. This silica is thrown down and enveloped by the ferric hydrate and is removed together with the latter by filtration. The filtered solution from the vat $g$ is led into a vacuum apparatus $h$ in which the solution is evaporated. We prefer to carry out the evaporation in vacuo both on account of economy and because we thereby avoid loss of nitric acid during evaporation. We only carry the evaporation so far that there remains sufficient water to form 30% nitric acid at the subsequent calcination. If desired, however, we may without difficulty evaporate so far as to obtain a 60% nitric acid by calcination.

The residue from evaporation is transferred to the calcining apparatus $j$ in which we heat the mass to about 300° C. We obtain the necessary heat for calcination from hot nitrous gases resulting from oxidation of atmospheric nitrogen for our nitric acid plant. In the condenser $k$ a part of the gases from the decomposition of the nitrates is condensed in the form of 30% nitric acid, while some nitrous gases pass through the condenser into the absorption towers $e_1$—$e_4$.

We lixiviate the calcined product in the vats $m$ according to the counter current principle, whereby alumina is obtained as a residue, and is filtered off on the filter $o$; dried and calcined in the calcining apparatus $n$. As our final product we thus obtain practically pure $Al_2O_3$ containing less than 01% $Fe_2O_3$ and which is therefore very well suited for the manufacture of aluminium. The solution obtained by lixivitation of the calcined nitrates contains pricipally calcium-nitrates. We evaporate this solution in a vacuum apparatus, preferably of the Kestner type, to such a point that the nitrate mass upon cooling solidifies. We then pulverize this solid mass which forms an excellent fertilizer consisting of a mixture of calcium nitrate and alkali metal nitrates and consequently is a very valuable by-product of our process.

The foregoing details have been given for clearness of understanding and no undue limitation should be deduced therefrom, but the appended claims should be construed as broadly as permissible in view of the prior art.

What we claim as new and desire to secure by Letters Patent of the United States is:

1. The process of producing alumina poor in iron comprising the steps of dissolving labradorite by a treatment with nitric acid according to the counter current principle until a neutral nitrate solution is obtained, filtering said solution from undissolved residue, adding to the solution a precipitant whereby iron and colloidal silica are precipitated, removing the precipitate from the solution, evaporating said solution and calcining the residue so as to decompose aluminium nitrate while the other nitrates remain undecomposed, removing said nitrates by lixiviation with water, and separating the solution obtained thereby from the undissolved alumina.

2. The process of producing alumina poor in iron comprising the steps of dissolving labradorite by a treatment with nitric acid according to the counter current principle until a neutral nitrate solution is obtained, filtering said solution from undissolved residue, adding to the solution alumina and keeping the temperature of the solution at substantially 40° C., whereby iron and colloidal silica are precipitated, removing the precipitate from the solution, evaporating said solution and calcining the residue so as to decompose aluminium nitrate while the other nitrates remain undecomposed, removing said nitrates by lixiviation with water, and separating the solution obtained thereby from the undissolved alumina.

3. The process of producing alumina poor in iron comprising the steps of dissolving labradorite by a treatment with nitric acid according to the counter current principle until a neutral nitrate solution is obtained, filtering said solution from undissolved residue, adding to the solution alumina in portions and keeping the temperature of the solution at 40° C., whereby iron and colloidal silica are precipitated, removing the precipitate from the solution, evaporating said solution and calcining the residue so as to decompose aluminium nitrate while the other nitrates remain undecomposed, removing said nitrates by lixiviation with water and separating the solution obtained thereby from the undissolved alumina.

4. The process of treating labradorite for the production of valuable products therefrom including alumina poor in iron and a fertilizer comprising the steps of dissolving the labradorite by a treatment with nitric acid according to the counter current principle until a neutral nitrate solution is obtained, filtering said solution from undissolved residue, adding to the solution a precipitant whereby iron and colloidal silica are precipitated, removing the precipitate from the solution, evaporating said solution and calcining the residue so as to decompose aluminium while the other nitrates remain undecomposed, removing said nitrates by lixiviation with water and separating the solution obtained thereby from the undissolved alumina, and evaporating said solution to recover therefrom a fertilizer.

5. The process of producing alumina poor in iron comprising the steps of dissolving labradorite by a treatment with nitric acid according to the counter current principle until a neutral nitrate solution is obtained, filtering said solution from undissolved residue, adding to the solution a precipitant whereby iron and colloidal silica are precipitated, removing the precipitate from the solution, evaporating said solution and heating the residue to substantially 300° C., so as to decompose aluminium nitrate while the other nitrates remain undecomposed, removing said nitrates by lixiviation with water, and separating the solution obtained thereby from the undissolved alumina.

Signed at Christiania, Norway, on this 29th day of November 1918.

VICTOR MORITZ GOLDSCHMIDT.
OYSTEIN RAVNER.